(12) United States Patent
Kurumisawa et al.

(10) Patent No.: US 7,453,601 B2
(45) Date of Patent: Nov. 18, 2008

(54) COLOR MATCHING PROFILE GENERATING DEVICE, COLOR MATCHING SYSTEM, COLOR MATCHING METHOD, COLOR MATCHING PROGRAM, AND ELECTRONIC APPARATUS

(75) Inventors: Takashi Kurumisawa, Shiojiri (JP); Katsumi Komagamine, Kagoshima (JP); Masanori Ishida, Kagoshima (JP)

(73) Assignee: Seiko Epson Corporation, Tokyo (JP)

( * ) Notice: Subject to any disclaimer, the term of this patent is extended or adjusted under 35 U.S.C. 154(b) by 720 days.

(21) Appl. No.: 11/061,889

(22) Filed: Feb. 22, 2005

(65) Prior Publication Data
US 2005/0195212 A1  Sep. 8, 2005

(30) Foreign Application Priority Data
Feb. 19, 2004 (JP) ............................. 2004-043223

(51) Int. Cl.
G06F 15/00 (2006.01)
G06F 3/00 (2006.01)
G06K 15/00 (2006.01)
G03F 3/08 (2006.01)
G09G 5/02 (2006.01)

(52) U.S. Cl. ...................... 358/1.9; 358/1.16; 358/3.23; 358/518; 710/8; 345/600

(58) Field of Classification Search ........................ None
See application file for complete search history.

(56) References Cited

U.S. PATENT DOCUMENTS 5,583,666 A  12/1996  Ellson et al.
6,081,254 A  6/2000  Tanaka et al.

(Continued)

FOREIGN PATENT DOCUMENTS

JP  A-06-253139  9/1994

(Continued)

OTHER PUBLICATIONS

Matoba, Naruhiro et al. "Image Processing technology for portable telephone and the application" Mitsubishi Denki Giho, Mitsubishi Denki Engineering, Japan, Aug. 25, 2002, vol. 76, No. 8, pp. 33-37.

*Primary Examiner*—Twyler L Haskins
*Assistant Examiner*—Barbara D Squibb
(74) *Attorney, Agent, or Firm*—Oliff & Berridge, PLC

(57) ABSTRACT

Aspects of the invention provide a color matching profile generating device that, in an apparatus having an input device and an output device, performs a color matching for the input device and the output device and reproduces favorable colors without depending on color characteristics of the devices. The color matching profile generating device can use an input device profile and an output device profile, in addition to a color conversion profile which defines color conversion characteristics in an absolute color space and generates a color matching profile for the input device and the output device. Since the color conversion profile defines the color conversion characteristics in the absolute color space, color conversion can be performed to image data obtained from the input device without depending on characteristics of the input device. Accordingly, by performing a color matching process with the generated color conversion profile, image data can be output with color characteristics determined in the absolute color space, irregardless of characteristics of the output device.

4 Claims, 8 Drawing Sheets

U.S. PATENT DOCUMENTS

| | | |
|---|---|---|
| 6,525,721 B1 * | 2/2003 | Thomas et al. .............. 345/600 |
| 6,553,431 B1 * | 4/2003 | Yamamoto et al. ............. 710/8 |
| 6,628,822 B1 | 9/2003 | Nakabayashi et al. |
| 6,633,400 B1 * | 10/2003 | Sasaki et al. ............... 358/1.15 |
| 7,382,379 B1 * | 6/2008 | Edge et al. .................. 345/600 |
| 2002/0031256 A1 | 3/2002 | Hiramatsu et al. |
| 2002/0145744 A1 * | 10/2002 | Kumada et al. ............. 358/1.9 |
| 2003/0202194 A1 | 10/2003 | Torigoe et al. |
| 2004/0109179 A1 * | 6/2004 | Haikin et al. ................ 358/1.9 |

FOREIGN PATENT DOCUMENTS

| | | |
|---|---|---|
| JP | A-07-056549 | 3/1995 |
| JP | A-09-046535 | 2/1997 |
| JP | A 10-322567 | 12/1998 |
| JP | A-11-032228 | 2/1999 |
| JP | A 2000-32281 | 1/2000 |
| JP | A 2001-16450 | 1/2001 |
| JP | A 2001-78047 | 3/2001 |
| JP | A-2003-271116 | 9/2003 |
| JP | A-2003-324620 | 11/2003 |

* cited by examiner

| LAPSED TIME | APPLIED DEVICE PROFILE |
|---|---|
| ONE YEAR | DEVICE PROFILE ONE YEAR LATER |
| TWO YEARS | DEVICE PROFILE TWO YEARS LATER |
| ⋮ | ⋮ |

COLOR MATCHING PROFILE GENERATING DEVICE, COLOR MATCHING SYSTEM, COLOR MATCHING METHOD, COLOR MATCHING PROGRAM, AND ELECTRONIC APPARATUS

BACKGROUND

1. Technical Field of Invention

Aspects of the invention can relate to a color matching system which is used to display image data to fit color characteristics of a display device.

2. Background of Related Art

Related art color matching systems which correct various source images to color characteristics fit to a color space of a display device are known. Generally, a color matching system may perform a color conversion between display devices with an ICC profile (International Color Consortium Profile) when an application itself uses a color matching mechanism of an OS (operating system). The ICC profile can be constructed by a 3×3 matrix, a three-dimensional table, or a four-dimensional table which defines relationships between a standard color space such as CIE (Commission Internationale de l'Eclairage) L*a*b* colorimetric system or CIE XYZ colorimetric system and device colors (RGB, CMYK or the like). For this reason, the implementation of the color matching system can compose a heavy burden on the application itself, and an application developer himself is needed to have sufficient knowledge of the color matching. Further, a user is needed to record the ICC profile itself, such as a monitor, in a location to be managed by the OS, but the setting method is different for every OS, and thus it is an actual situation that the number of users who realize the color matching is limited.

On the other hand, apparatuses having a color panel mounted mechanism, such as cellular phones, can be circulated as finished products, and thus it is preferable that color reproducibility is realized within the apparatus, without having an advanced color matching mechanism. In recent years, however, like camera mounted cellular phones, colors of an image itself are needed to be accurately reproduced on the display device of the apparatus and further on other cellular phones, display devices, such as personal computers or printers on the network. As such, instead of the color reproducing method only within the conventional apparatus, demands for a color reproducing technique with a color matching on an assumption that the more general ICC profile is used is increasing.

Further, as the use of camera mounted cellular phones has widely spread in recent years, a color matching technique for an input device and an output device is highly demanded. When an image captured by the camera mounted cellular phone is displayed on a liquid crystal panel, since the color reproduced area by the input device is different from the color reproduced area by the output device, the color matching is preferably performed by a certain method. On the other hand, a technique in which favorable colors can be reproduced with colors called as memory colors, such as skin flesh, sea blue or spring green, independently of the color matching is known. Further, since complex color reproduction algorithm needs a large processing ability, it is not suitable for the camera mounted cellular phone.

SUMMARY OF INVENTION

Aspects of the invention can provide a color matching system which, in an apparatus having an input device and an output device, can perform a color matching for the input device and the output device and can reproduce favorable colors without depending on color characteristics of the devices.

According to an aspect of the invention, there can be provided a color matching profile generating device which, based on an input device profile defining color characteristics of an input device, an output device profile defining color characteristics of an output device, and a color conversion profile defining color conversion characteristics in an absolute color space, generates a color matching profile for the input device and the output device. The color matching profile generating device can generate the color matching profile for the input device and the output device based on the input device profile and the output device profile, in addition to the color conversion profile defining the color conversion characteristics in the absolute color space. The color conversion profile can define the color conversion characteristics in the absolute color space, and thus a color conversion is performed to image data obtained from the input device without depending on the characteristics of the input device. Accordingly, by performing the color matching process with the generated color conversion profile, image data can be output with the color characteristics determined in the absolute color space irregardless of the characteristics of the output device.

According to another aspect, the color matching profile generating device can include a conversion device for converting source image data into image data in the absolute color space based on the input device profile, and a color conversion profile generating device for adjusting color characteristics of image data in the absolute color space to generate the color conversion profile.

According to a further aspect of the color matching profile generating device, the color conversion profile generating device analyzes image data of the absolute color space and generates the color conversion profile based on the analysis result. The color conversion profile can be generated based on the analysis result of image data in the absolute color space, and thus the analysis of image data can be stably made without depending on the characteristics of the input device and the output device, thereby performing the color matching fit to image data.

According to another aspect of the invention, there can be provided a color matching profile generating method comprising a step of acquiring an input device profile defining color characteristics of an input device, a step of acquiring an output device profile defining color characteristics of an output device, a step of generating a color conversion profile defining color conversion characteristics in an absolute color space, and a step of generating a color matching profile for the input device and the output device based on the input device profile, the output device profile, and the color conversion profile.

According to the color matching profile generating method, the color conversion profile defines the color conversion characteristics in the absolute color space, and thus the color conversion is performed to image data obtained from the input device without depending on the characteristics of the input device. Accordingly, by performing the color matching process with the generated color conversion profile, image data can be output with the color characteristics determined in the absolute color space irregardless of the characteristics of the output device.

According to a further aspect of the invention, there can be provided a color matching profile generation program which is executed by a computer to make the computer perform a step of acquiring an input device profile defining color characteristics of an input device, a step of acquiring an output device profile defining color characteristics of an output device, a step of generating a color conversion profile defining color conversion characteristics in an absolute color space, and a step of generating a color matching profile for the input device and the output device based on the input device profile, the output device profile, and the color conversion profile. By executing the color matching profile generation program on the computer, the color matching profile generating device can be implemented.

According to another aspect of the invention, there can be provided a color matching system including a profile memory unit for storing a plurality of color matching profiles for an input device and an output device during use according to deterioration with time of at least one of the input device and the output device, a color matching processing device for performing a color matching process on image data, which is supplied from the input device, using one of the plurality of color matching profiles to output the result to the output device, and an updating device for detecting the used period of at least one of the input device and the output device and selecting one of the plurality of color matching profiles based on the detected used period, if necessary, for performing an update process which updates the color matching profile used by the color matching processing device.

According to the color matching system, the plurality of color matching profiles are stored for the used period according to the deterioration with time of at least one of the input device and the output device. And then, according to the used period of the input device and/or the output device, the plurality of color matching profiles are suitably updated, thereby performing the color matching process. Accordingly, even when the deterioration with time due to the characteristics of the input device or the output device occur, the changes are absorbed by the color matching profile, and thus favorable color reproducibility can be constantly ensured.

According to a further aspect of the invention, in the color matching system, the updating means deletes the color matching profile corresponding to an expired use period, from the profile memory unit. By deleting the color matching profile which is no longer used by the update, the limited storage capacity of the memory unit can be efficiently used.

According to an additional aspect of the invention, in the color matching system, the updating means may perform the update process after a power supply is applied to the input device and the output device. Further, according to a ninth aspect of the invention, the updating means may perform the update process at every predetermined time.

According to a tenth aspect of the present invention, there is provided a color matching method that can include a profile storing step of storing a plurality of color matching profiles for an input device and an output device during use according to deterioration with time of at least one of the input device and the output device, a color matching processing step of performing a color matching process on image data, which is supplied from the input device, using one of the plurality of color matching profiles to output the result to the output device, and an updating step of detecting the used period of at least one of the input device and the output device and selecting one of the plurality of color matching profiles based on the detected used period, if necessary, for updating the color matching profile used in the color matching processing step.

According to the color matching method, the plurality of color matching profiles are stored for the used period according to the deterioration with time of at least one of the input device and the output device. And then, according to the used period of the input device and/or the output device, the plurality of color matching profiles are suitably updated, thereby performing the color matching process. Accordingly, even when the deterioration with time due to the characteristics of the input device or the output device occur, the changes are absorbed by the color matching profile, and thus favorable color reproducibility can be constantly ensured.

According to a further aspect of the invention, there can be provided a color matching program which is executed on a computer having a plurality of memory units and which makes the computer perform a profile storing step of storing in the plurality of memory units a plurality of color matching profiles for an input device and an output device during use according to deterioration with time of at least one of the input device and the output device, a color matching processing step of performing a color matching process on image data, which is supplied from the input device, using one of the plurality of color matching profiles to output the result to the output device, and an updating step of detecting the used period of at least one of the input device and the output device and selecting one of the plurality of color matching profiles based on the detected used period, if necessary, for updating the color matching profile used in the color matching processing step. By executing the color matching program on the computer, the color matching system can be implemented.

According to another aspect of the invention, there can be provided a color matching system including a profile memory unit for storing a color matching profile for an input device and an output device, the color matching profile being generated based on an input device profile defining color characteristics of the input device, an output device profile defining color characteristics of the output device, and a color conversion profile defining color conversion characteristics in an absolute color space, a color matching processing device for performing a color matching process on image data, which is supplied from the input device, with the color matching profile and outputting the result to the output device, a detecting device for detecting a lighting control state of an environment in which at least one of the input device and the output device is present, and an updating device for correcting the color conversion profile based on the detected lighting control state and updating the color matching profile using the corrected color conversion profile.

According to the color matching system, the color matching profile for the input device and the output device is stored, the color matching process is performed on image data, which is supplied from the input device, with the color matching profile, and then the result is output to the output device. Here, the lighting control state of the environment in which at least one of the input device and the output device is present is detected, the color conversion profile is corrected based on the detected lighting control state, and the color matching profile is updated using the corrected color conversion profile. Accordingly, according to the lighting control state of the environment in which the input device or the output device is present, the color conversion profile is corrected to perform the suitable color conversion and the corrected color conversion profile is reflected in the color matching profile. Therefore, even if the lighting control state changes, a favorable color reproducibility can be stably realized.

According to a further aspect of the invention, in the color matching system, the absolute color space is an $L^*a^*b^*$ space which is constructed by elements L, $a^*$, and $b^*$, and the updating device corrects the color conversion profile for the elements separately. The color conversion profile is corrected separately for the respective elements L, $a^*$, and $b^*$ constituting the absolute color space, and thus optimal correction can be performed according to various changes in the lighting control state.

According to another aspect of the invention, in the color matching system, the input device may be a camera module which serves as the detecting device. Thus, there is no need for providing a dedicated sensor or the like to detect the lighting control state.

According to an additional aspect of the invention, there can be provided a color matching method including a profile storing step of storing in a memory unit a color matching profile for an input device and an output device, the color matching profile being generated based on an input device profile defining color characteristics of the input device, an output device profile defining color characteristics of the output device, and a color conversion profile defining color conversion characteristics in an absolute color space, a color matching processing step of performing a color matching process on image data, which is supplied from the input device, with the color matching profile and outputting the result to the output device, a detecting step of detecting a lighting control state of an environment in which at least one of the input device and the output device is present, and an updating step of correcting the color conversion profile based on the detected lighting control state and updating the color matching profile using the corrected color conversion profile.

According to the color matching method, the color matching profile for the input device and the output device is stored, the color matching process is performed to image data, which is supplied from the input device, with the color matching profile, and the result is output to the output device. Here, the lighting control state of the environment in which at least one of the input device and the output device is present is detected, the color conversion profile is corrected based on the detected lighting control state, and the color matching profile is updated using the corrected color conversion profile. Accordingly, according to the lighting control state of the environment in which the input device or the output device is present, the color conversion profile is corrected to perform the suitable color conversion and the corrected color conversion profile is reflected in the color matching profile. Thus, even when the lighting control state changes, favorable color reproducibility can be stably realized.

According to a further aspect of the invention, there can be provided a color matching program which is executed on a computer having a memory unit and which makes the computer perform a profile storing step of storing in the memory unit a color matching profile for an input device and an output device, the color matching profile being generated based on an input device profile defining color characteristics of the input device, an output device profile defining color characteristics of the output device, and a color conversion profile defining color conversion characteristics in an absolute color space, a color matching processing step of performing a color matching process on image data, which is supplied from the input device, with the color matching profile and outputting the result to the output device, a detecting step of detecting a lighting control state of an environment in which at least one of the input device and the output device is present, and an updating step of correcting the color conversion profile based on the detected lighting control state and updating the color matching profile using the corrected color conversion profile. By executing the color matching program on the computer, the color matching system can be implemented.

Further, the color matching system can preferably be mounted on an electronic apparatus having an input device and an output device to be associated with them.

BRIEF DESCRIPTION OF THE DRAWINGS

The invention will be described with reference to the accompanying drawings, wherein like numerals reference like elements, and wherein.

DETAILED DESCRIPTION OF PREFERRED MBODIMENTS

Hereinafter, preferred embodiments of the invention will be described with reference to the drawings.

Figure 1:
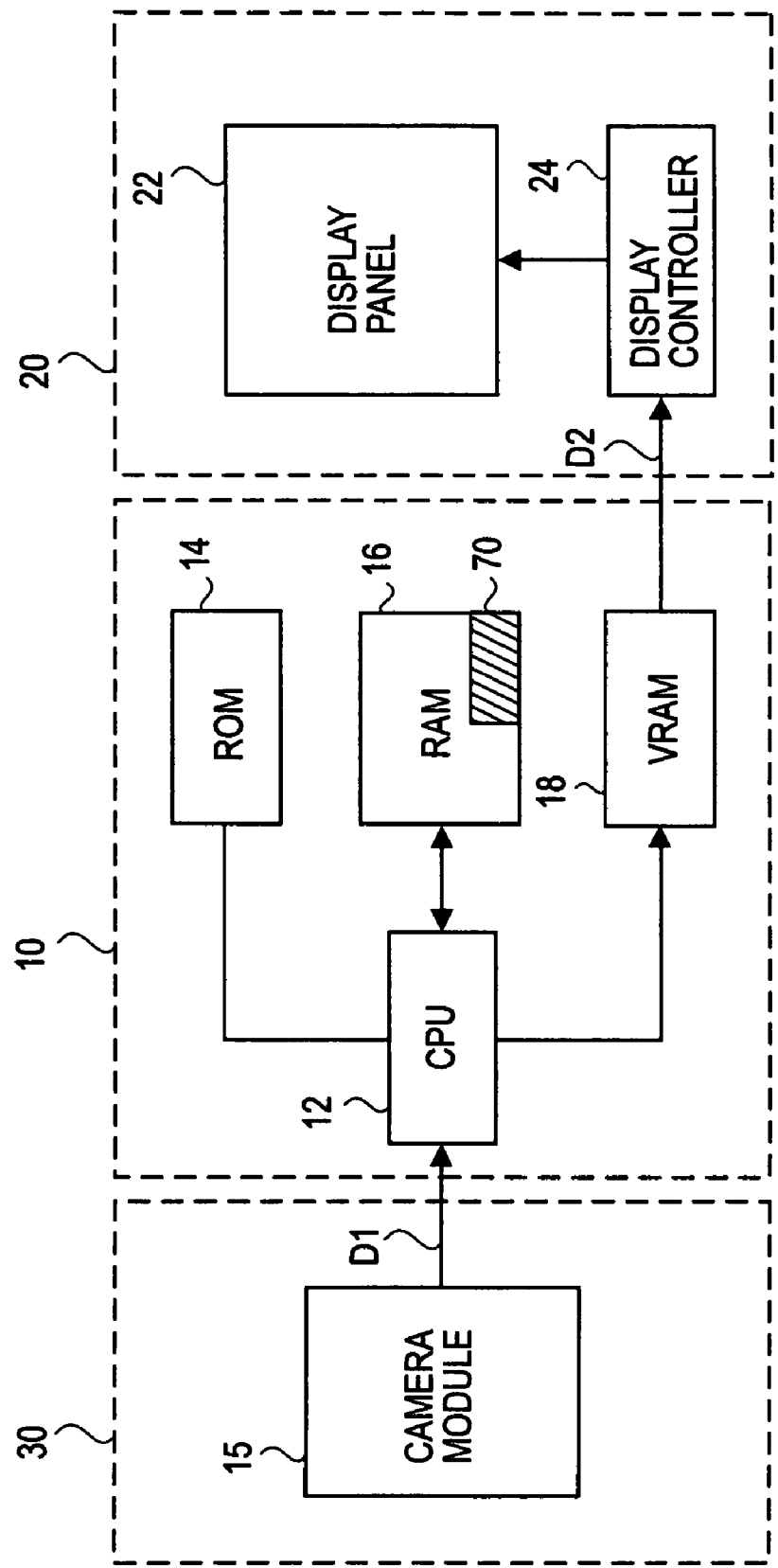
FIG. 1 is an exemplary block diagram showing a schematic configuration of an image display device to which the invention is applied.

FIG. 1 shows a schematic configuration of an image display device 100 to which a color matching system of the invention is applied. The image display device 100 can be constructed by a terminal device, such as a camera mounted cellular phone into which a camera module as an input device and a display panel as an output device are integrated. However, such an application is not intended to limit the invention.

The image display device 100 is broadly divided into an image processing unit 10, a display unit 20, and an imaging unit 30. The imaging unit 30 has a camera module 15 and supplies motion pictures or still pictures captured by the camera module 15 as source image data D1 to the image processing unit 10.

The image processing unit 10 can perform a color matching process to source image data D1 to be supplied from the imaging unit 30 to generate display image data D2 and supplies it to the display unit 20. Specifically, the image processing unit 10 has a CPU 12, a ROM 14, a RAM 16, a VRAM 18, and so on.

The ROM 14 stores an OS which takes charge of basic controls of the image processing unit 10 and various application programs. The RAM 16 stores a variety of application software or image data. In addition, in the RAM 16, a device link profile serving as a color matching profile in the present invention is stored, of which details will be described below. Further, a portion of the RAM 16 may be used as a working memory in the color matching process by the image processing unit 10. The VRAM 18 is an image memory which stores display image data D2 after the color matching process by the image processing unit 10 is completed. The CPU 12 executes the OS or the application programs stored in the ROM 14 to perform various processes including the color matching process described later and controls.

The display unit 20 displays display image data D2 supplied from the image processing unit 10 on a display panel 22. The display panel 22 may be constructed by a liquid crystal panel, for example, but this is not intended to limit the invention. A display controller 24 generates driving signals for pixels of the display panel 22 based on display image data D2 and supplies them to the display panel 22 to drive the display panel 22. Thus, on the display panel 22, an image corresponding to display image data D2 supplied from the image processing unit 10 is displayed.

Figure 2:
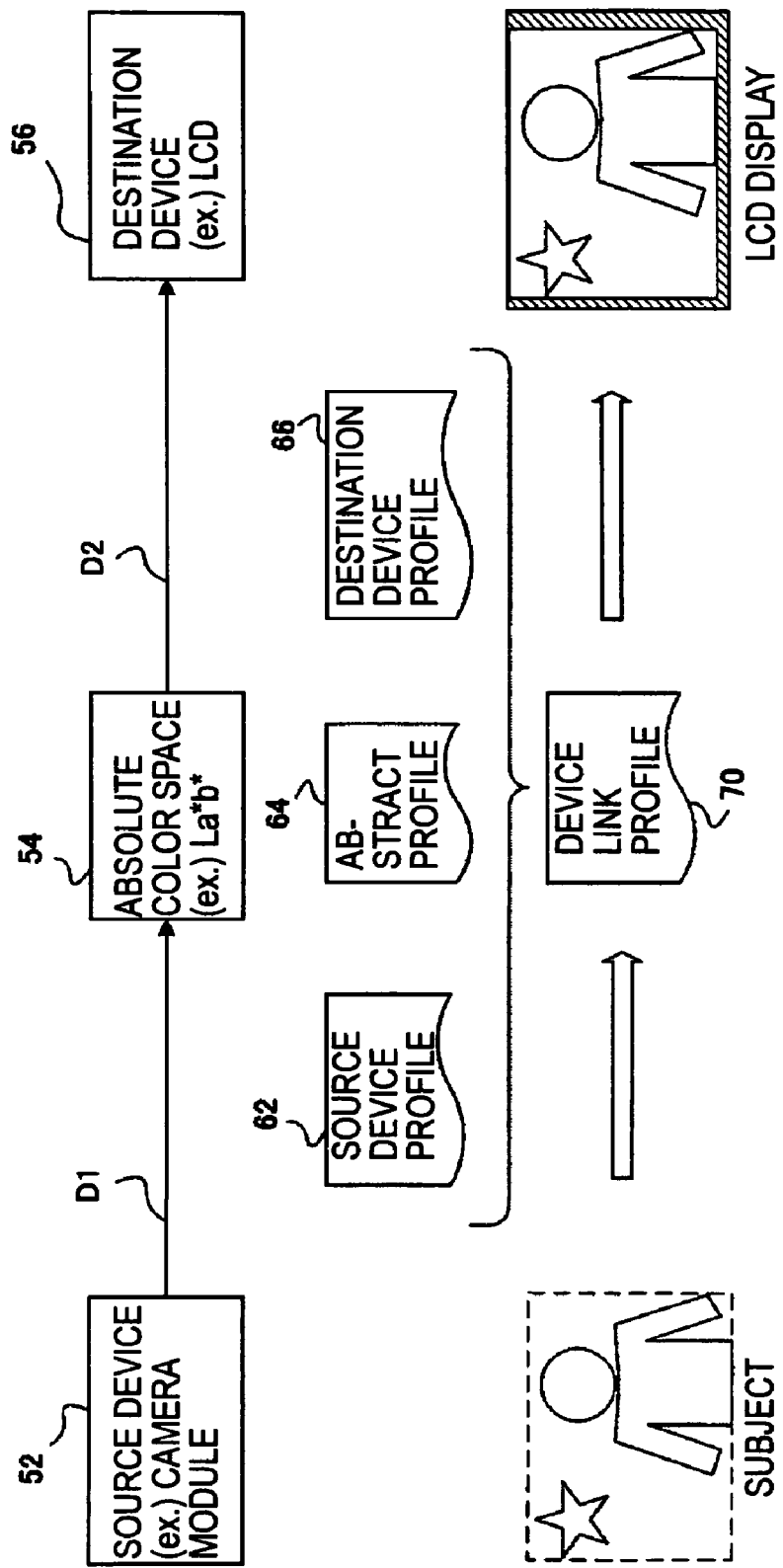
FIG. 2 shows an outline of a color matching process according to the invention.

Next, a principle of a color matching according to the invention will be described. FIG. 2 schematically shows a basic principle of a color matching according to the invention. As shown in FIG. 2, source image data D1 generated by a source device (input device), such as a camera module, is converted into an absolute color space such as the L*a*b* colorimetric system. And then, required processes such as color adjustment are performed in the absolute color space and thus display image data D2 is generated. Display image data D2 is supplied to a destination device 56 (output device) such as an LCD (Liquid Crystal Display) panel such that an image is displayed thereon.

Here, when source image data D1 is converted into image data in the absolute color space, a source device profile 62 is used. The source device profile 62 is data which defines color attributes in the color space of the source device. Source image data D1 is converted into image data in the absolute color space (in this example, L*a*b*) based on the color attributes.

Next, required image processes are performed to image data in the absolute color space. The required image processes includes processes on luminosity, contrast, saturation, conversions of specific colors, or memory colors. The process on the memory colors is a process that adjusts skin flesh, see blue, or spring green so as to be cleanly displayed on a person's eyesight. Here, the image processes are performed using one-dimensional (1D) lookup tables (LUT) for three elements L, a*, and b* in the absolute color space L*a*b* respectively and using a three-dimensional (3D) LUT for three elements of L*, a*, and b*. And then, an abstract profile 64 which defines the color conversion or color adjustment by the image processes is generated. That is, the abstract profile 64 is data which defines a color conversion method for performing favorable color reproduction in the absolute color space.

On the other hand, as for the destination device 56, there is a destination device profile 66 which defines color characteristics thereof. The destination device profile 66 is data for performing favorable color reproduction on the destination device 56.

On the image display device 100 of the invention, the camera module 15 as the source device and the display panel 22 as the destination device are mounted to be associated with each other and a combination of the source device and the destination device is fixed. Thus, based on the source device profile 62, the abstract profile 64, and the destination device profile 66, one device link profile 70 is generated and stored. That is, the device link profile 70 is data which defines a color conversion method from a color space of the source device 52 to a color space of the destination device 56, including the above-mentioned required image processes. The image display device 100 stores the device link profile 70 in the RAM 16, for example, performs the color matching process to source image data D1 according to the device link profile 70, and supplies the result to the destination device 56. Accordingly, on the display panel 22 as the destination device 56, display image data D2 is displayed with favorable color characteristics.

In the above-mentioned image display device 100, the abstract profile 64 which defines the required image processing method is generated in the absolute color space, and thus the abstract profile 64 is defined so as to perform favorable color reproduction in the absolute color space. Thus, if the color matching process is performed according to the device link profile 70 which is generated to include the abstract profile 64, it has advantages that an image which is displayed on the destination device 56 has favorable color characteristics in the absolute color space and thus the image does not depend on color characteristics of the source device or destination device.

Figure 3:
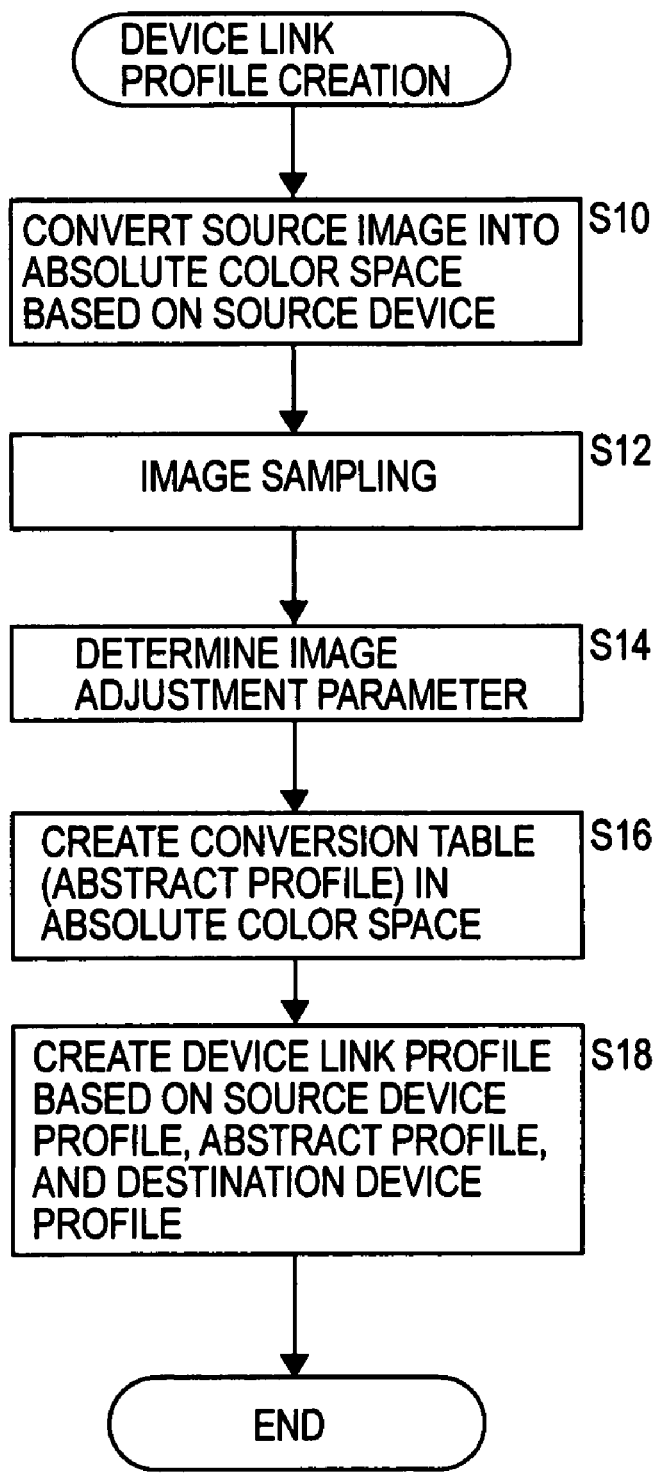
FIG. 3 is a flowchart of a device link profile generation process.

FIG. 3 shows a flowchart of a device link profile generation process. Moreover, the device link profile is generated in advance in the following sequence by a device (hereinafter, referred to as 'profile generating device') different from the image display device 100. Moreover, the profile generating device may be constructed by a computer device having a CPU, a RAM, and so on, and generates the device link profile 70 by executing a program corresponding to the following processes. And then, the generated device link profile 70 is previously stored in a memory unit such as the ROM 14 or RAM 16 of the image display device 100 shown in FIG. 1.

To begin with, referring to FIG. 3, the profile generating device converts a source image into the absolute color space based on the source device profile (step S10). When the device link profile of the image display device 100 is generated, the source image is an image output from the camera module. Further, as the source image itself, for example, a standard image pattern or the like can be used.

Next, the profile generating device samples the source image converted into the absolute color space (step S12). And then, the profile generating device determines image adjustment parameters of sampled image data according to an input of a worker (step S14) and generates a conversion table in the absolute color space, that is, the abstract profile (step S16).

And then, the profile generating device generates the device link profile based on the source device profile, the abstract profile, and the destination device profile (step S18). The device link profile generated in such a manner is a profile for the color matching between the source device (that is, the camera module 15) and the destination device (that is, the display panel 22) which are mounted on the image display device 100. The device link profile is stored in the image display device 100 and is used for the color matching process.

The above-mentioned device link profile generation process is intended for the case in which the worker inputs the image adjustment parameters in the absolute color space. However, if the image adjustment parameters and their adjustment quantities in the absolute color space are determined in advance, the device link profile can be automatically generated. In particular, as for the so-called memory color, such as skin flesh or sea blue, by determining an image adjustment method in advance, it is possible to apply the automatic device link profile generation.

Figure 4:
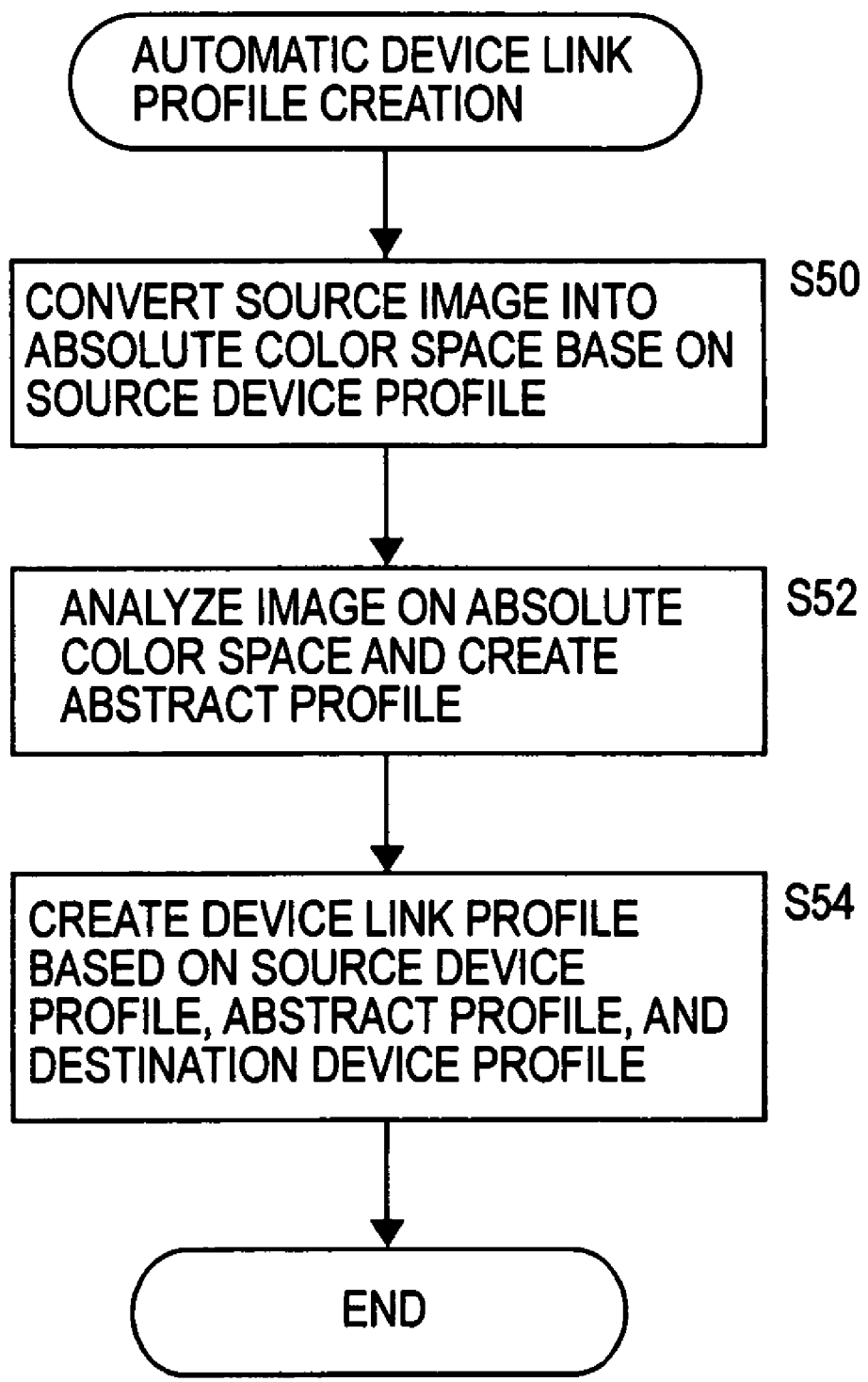
FIG. 4 is a flowchart of an automatic device link profile generation process.

FIG. 4 shows a flowchart of an exemplary automatic device link profile generation process. The specific process is the same as the generation process shown in FIG. 3. That is, to begin with, the profile generating device converts the source image into the absolute color space based on the source device profile (step S50). Next, the profile generating device analyzes image data converted into the absolute color space and generates the abstract profile according to the image adjustment parameters and their adjustment quantities determined in advance (step S52). And then, the profile generating device generates the device link profile based on the source device profile, the abstract profile, and the destination device profile (step S54).

Next, a first example of an image display device to which the invention is applied will be described. In the first example, the above-mentioned device link profile is plurally generated in advance in consideration of deterioration with time in the source device and/or the destination device and stored in the image display device 100. And then, for use, the plural device link profiles are switched.

In an apparatus, such as a camera mounted cellular phone, the color matching process is preferably preformed such that a user can not be conscious. When plural source device or destination device profiles exist, the data size of the device link profile increases. However, at the time of the combination of one camera module and one display panel, even when plural device link profiles are stored, the storage capacity of the device is not pressed so much. On the other hand, the deterioration with time in the device such as the camera module or the display panel can be expected from various device characteristics. Thus, by preparing and storing plural device link profiles according to the deterioration with time in the device such as the camera module or the display panel in advance and by switching them for use according to the deterioration with time, the color matching fit to the deterioration with time in the device can be automatically performed.

Figures 5A, 5B:
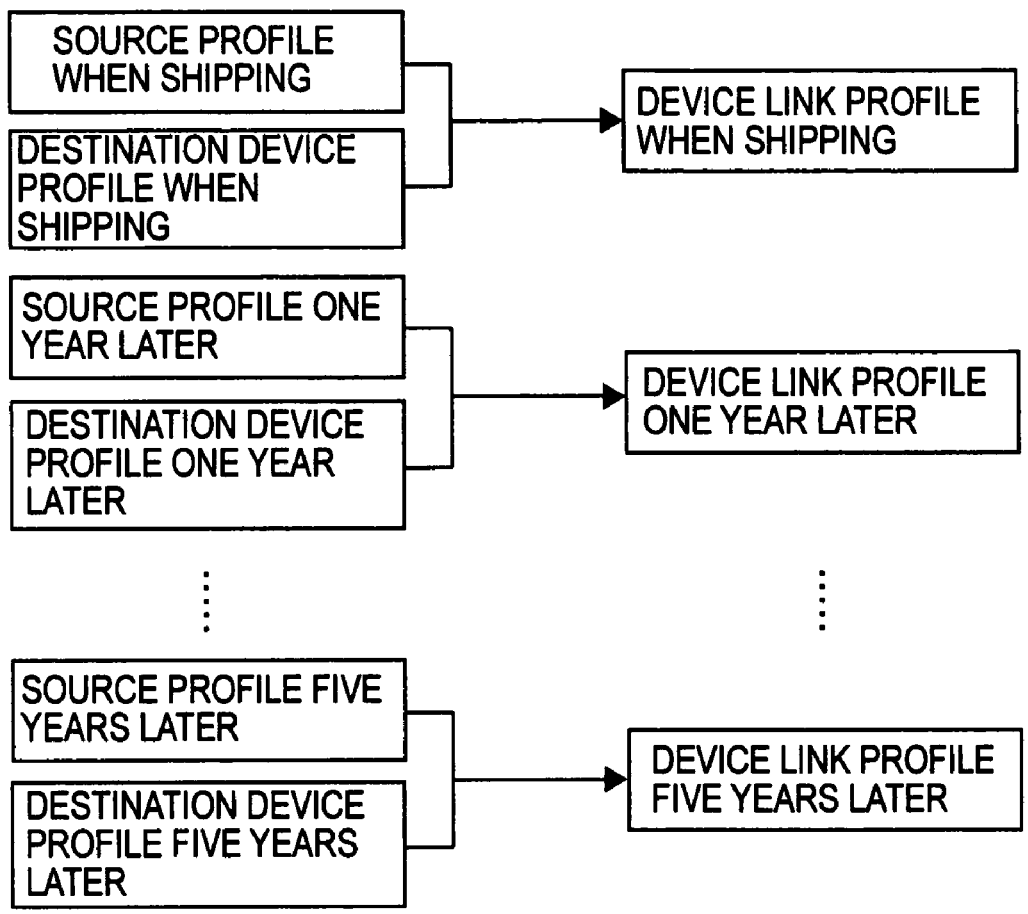
FIGS. 5A and 5B show an example of a device link profile according to a first example.

FIG. 5A shows an example of plural device link profiles which are prepared according to deterioration with time. As shown in FIG. 5A, using a source device profile at the time of shipping which defines color characteristics of the source device (the camera module 15) mounted on the image display device 100 when shipping, a destination device profile at the time of shipping which defines color characteristics of the destination device (the display panel 22) when shipping, and the above-mentioned abstract profile, a device link profile at the time of shipping is generated. Moreover, in the present example, if necessary, the device link profile may be generated with no abstract profile.

Similarly, using a source device profile one year later and a destination device profile one year later, a device link profile one year later is generated. In such a manner, after expecting characteristic deterioration of the source device and the destination device for every predetermined period (in this example, for every year) from shipping, the source device profiles and the destination device profiles are generated and the device link profiles for every predetermined period from shipping are prepared using the source device profiles and the destination device profiles. And then, the plural device link profiles are stored in the memory unit such as the ROM or the RAM of the image display device 100 when shipping.

In addition, the image display device 100 stores an update database of the device link profiles. As exemplarily shown in FIG. 5B, the update database shows correspondence relationships between the lapsed time after shipping and the device link profile which is used for that period.

Figure 6:
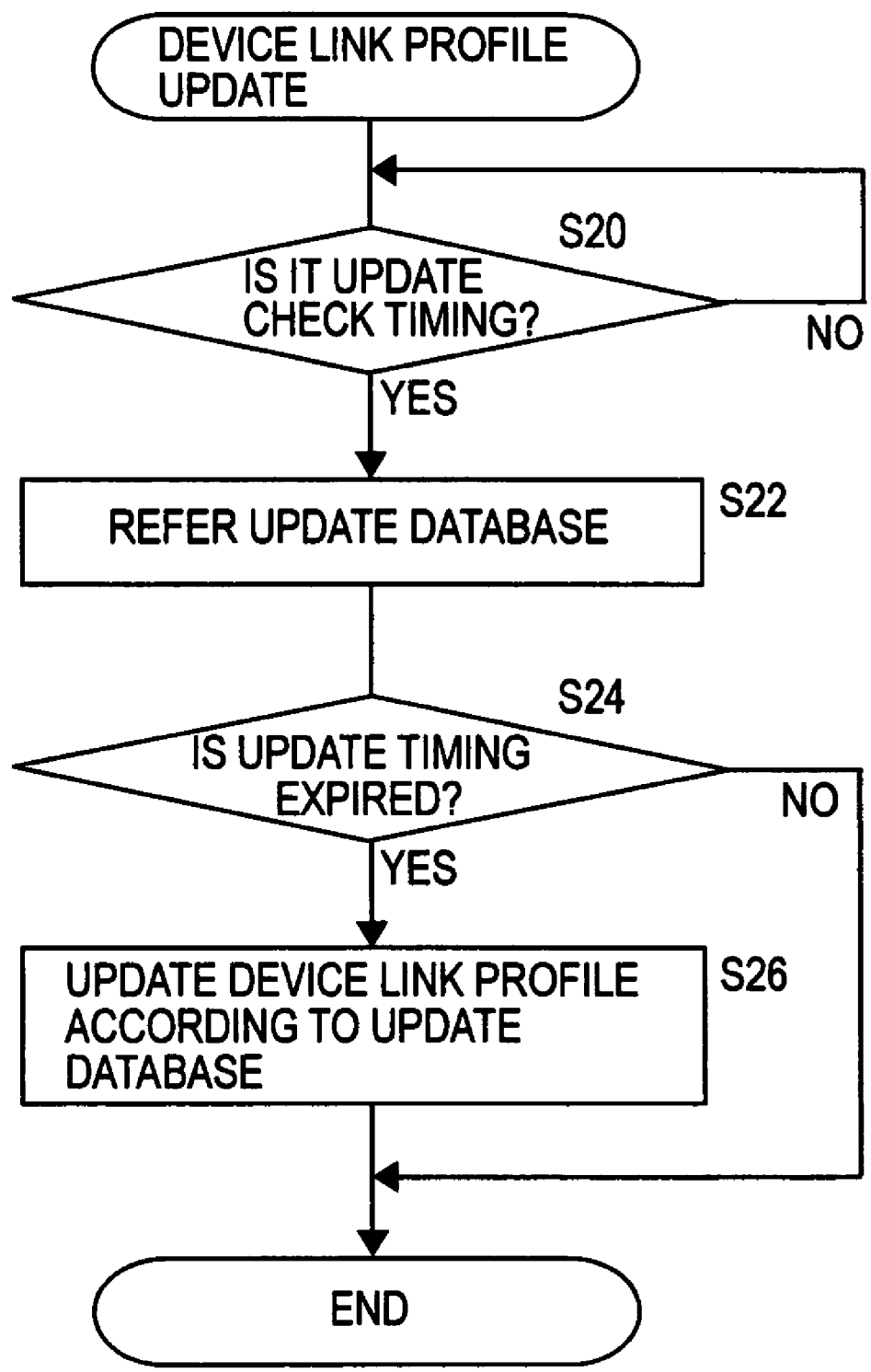
FIG. 6 shows a flow of an update process of the device link profile according to the first example.

The image display device 100 uses the update database and updates the device link profile according to the used period of the image display device 100. FIG. 6 shows a flowchart of an exemplary device link profile update process. Moreover, this process can be realized by allowing the CPU 12 to execute the program prepared and stored in advance in the ROM 14 or the like.

The image display device 100 has the CPU 12, and so on, as shown in FIG. 1, and thus the lapsed time can be counted by the CPU 12. For example, the CPU 12 can count the lapsed time of the image display device 100, such as a cellular phone or the like, from a point of time at which a power supply is applied to the image display device 100 for the first time after shipping.

The image display device 100 determined whether or not the update check timing comes (step S20). Here, the update check timing is the timing at which the determination whether or not the device link profile should be updated is performed. For example, if the update check timing is set when the power supply is applied to the image display device 100, the update process shown in FIG. 6 is performed whenever the power supply is applied to the image display device 100. When the image display device 100 is the cellular phone, the update check timing may be set just after the charging of the cellular phone starts. Further, irregardless of presence/absence of operations such as the application of the power supply, the update check timing may be set to every predetermined time (for example, for every day). In addition, the update check timing may be set to the combination of the time of the power supply application and the specific time every day.

If the update check timing comes, the CPU 12 refers the update database exemplarily shown in FIG. 5B (step S22) and determines whether or not the update timing is expired (step S24). Specifically, it is determined whether or not the device link profile corresponding to the lapsed time at that time and the device link profile which is currently being used accord with each other. If the update timing is expired (the step S24; Yes), the CPU 12 reads based on the update database the device link profile corresponding to the lapsed time at that time from the memory unit, such as the ROM or the RAM, and sets it as the device link profile to be used for the color matching process.

In such a manner, the image display device 100 refers the update database and updates the device link profile, if necessary, whenever the predetermined update check timing comes. Thus, the device link profile to be used for the color matching process according to the deterioration with time in characteristics of the source device or the destination device mounted on the image display device 100 is selected. Thus, even when the characteristics of the device such as the camera or the LCD panel of the camera mounted cellular phone change by annual deterioration or the like, image data can be displayed with suitable color characteristics according to the change.

In a step S26, after a new device link profile is set, the device link profile which was used till then becomes unnecessary. Thus, after performing the update, the CPU 12 may delete the device link profile, which was used till then, from the memory unit. Accordingly, limited storage capacity in the image display device 100 can be efficiently used.

Moreover, the number of device link profiles which are stored in advance in the memory unit at the time of shipping the image display device 100 is determined based on conditions of the deterioration with time in the characteristics of the source device or the destination device, the storage capacity of the memory unit, and so on.

Next, a second example of an exemplary image display device to which the invention is applied will be described. According to the second example, the image display device updates the device link profile according to lighting control state of an environment in which the device is present.

Even though the source device or the destination device mounted on the image display device does not change, the device link profile to be used for the color matching process may be corrected according to the lighting control state, for example, luminosity of an illumination or illumination colors, of the environment in which the device itself is present. In the present example, a device for detecting the lighting control state of the environment in which the device is present is provided, and the abstract profile is corrected according to the detected lighting control state to update the device link profile. As the means for detecting the lighting control state, a dedicated optical sensor may be provided in the image display device 100. Further, when the image display device 100 has imaging means, like the camera mounted cellular phone, the lighting control state may be detected with the imaging means.

Figure 7:
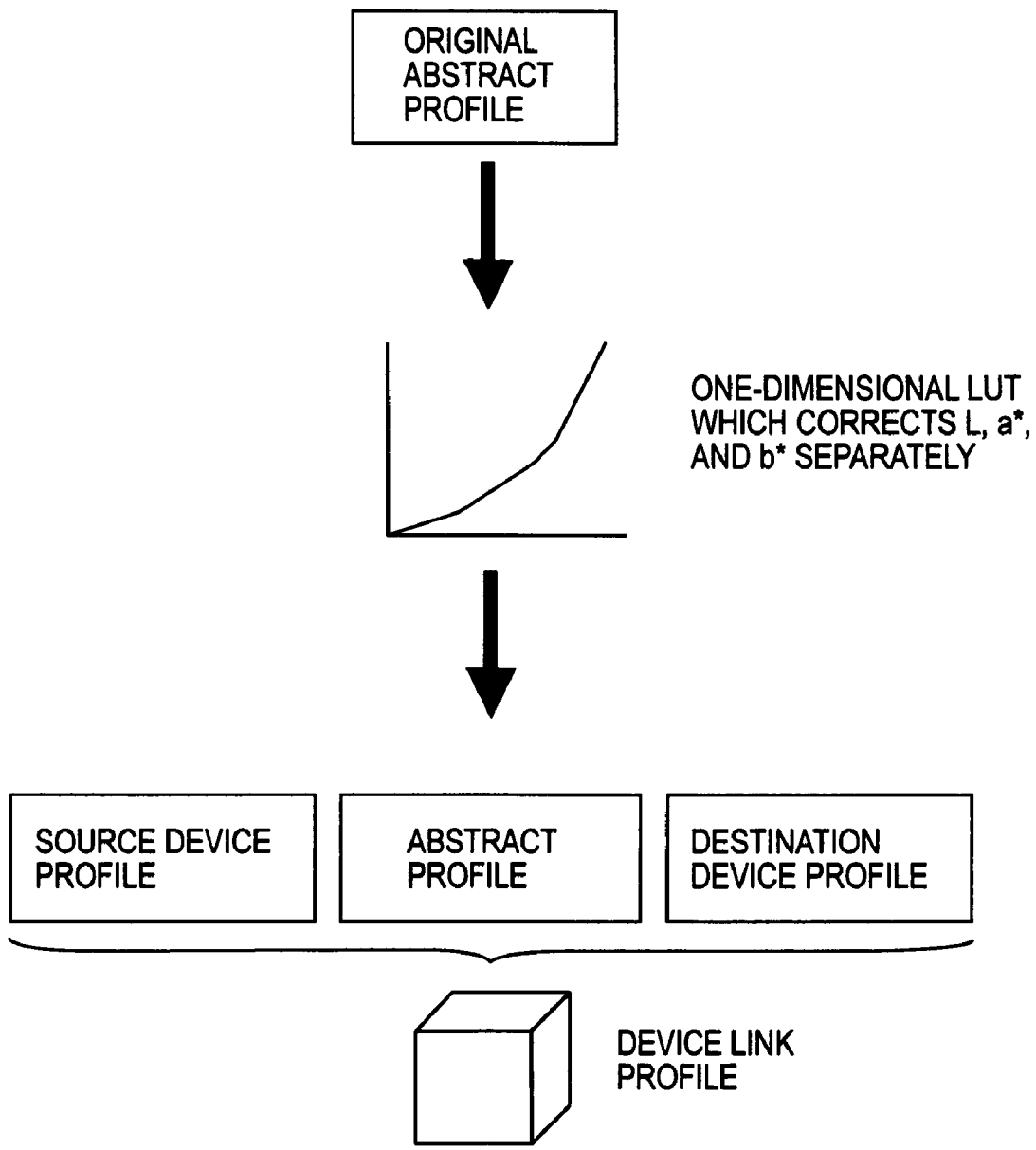
FIG. 7 schematically shows an update method of a device link profile according to a second example.

FIG. 7 schematically shows an outline of the process in the present example. To begin with, an abstract profile to a standard lighting control state (hereinafter, referred to as 'original abstract profile') is generated. And then, based on the original abstract profile, the source device profile, and the destination device profile, the device link profile is generated and stored in the memory unit. Further, the color matching process is performed with the device link profile.

The detecting means for detecting the lighting control state mounted on the image display device detects an ambient lighting control state (for example, luminosity or the like). And then, when a change in detection data indicating the lighting control state exceeds a predetermined threshold value, the original abstract profile is corrected. And then, based on the corrected abstract profile, the source device profile, and the destination device profile, a new device link profile is generated and stored in the memory unit. Thereafter, the new device link profile is used.

Moreover, there are many methods for correcting the abstract profile based on the change in the lighting control state. In a suitable method, one-dimensional (ID) lookup tables (LUT) for three elements L, a*, and b* in the absolute color space L*a*b* are generated respectively, and the elements L, a*, and b* are corrected separately from each other according to the lighting control state. According to this method, for the change in luminosity among the changes in the lighting control state, the element L indicating brightness is mainly corrected, and for the change in the color tone of the illumination, the elements a* and b* influencing saturation and color are mainly corrected. That is, fine correction can be performed. Of course, the correction method is not limited to the above-mentioned method. For example, the correction may be performed with the three-dimensional LUT for the elements L*, a*, and b*.

Figure 8:
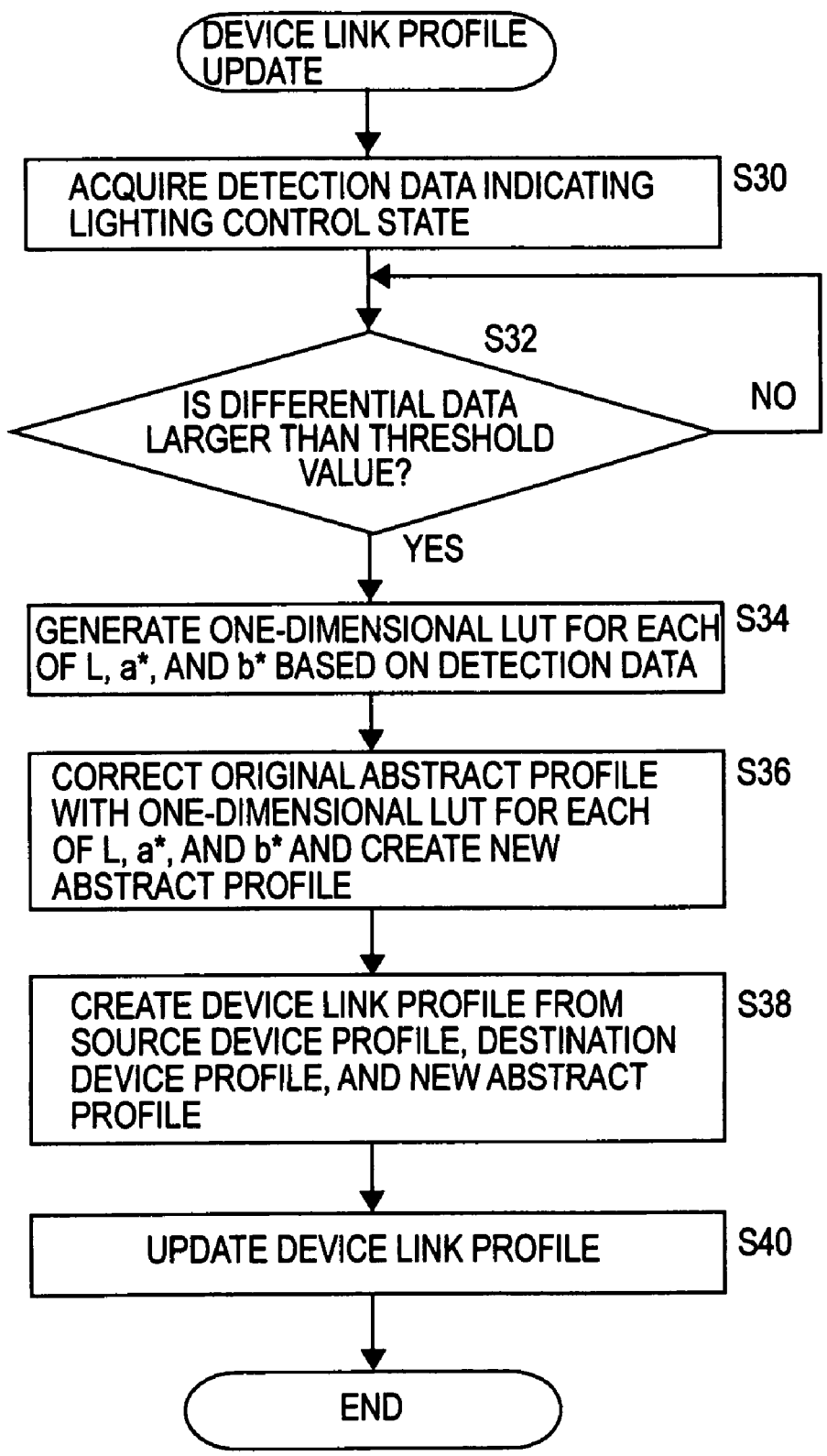
FIG. 8 shows a flow of an update process of the device link profile according to the second example.

Next, an update process of the device link profile will be described. FIG. 8 shows a flowchart of the update process of the device link profile according to the second example. Moreover, this process is realized by allowing the CPU 12 or the like in the image display device 100 to execute the program prepared in advance.

To begin with, the image display device 100 acquires detection data indicating the lighting control state by means of the device for detecting the lighting control state (step S30), and determines whether or not the difference between detection data and previous data exceeds the predetermined threshold value (step S32). If the difference exceeds the threshold value (step S32; Yes), the image display device 100 generates the one-dimensional LUTs for each elements L, a*, and b* based on acquired detection data (step S34). In these LUTs, correction characteristics according to the lighting control state are reflected.

Next, the CPU 12 corrects the original abstract profile with the generated one-dimensional LUTs to generate the new abstract profile (step S36). And then, based on the new abstract profile, the source device profile, and the destination device profile, a device link profile is generated (step S38), and the device link profile which was used till then is replaced with the newly generated device link profile, thereby updating the device link profile (step S40).

In such a manner, the abstract profile is corrected according to the lighting control state of the environment in which the image display device 100 is present, and thus the optimal device link profile is generated, thereby performing the color matching process.

Moreover, the color matching process according to the present invention can be intended for input devices (for example, CCD (charge-coupled device) camera), output devices (for examples, LCD (liquid crystal device), or various image data, such as contents (images from an external information provider), images captured by digital cameras or the like.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A color matching system comprising:
a profile memory unit that stores a plurality of color matching profiles for an input device and an output device during use according to deterioration with time of at least one of the input device and the output device;
a color matching processing device that performs a color matching process on image data, that is supplied from the input device, using one of the plurality of color matching profiles to output the result to the output device; and
an updating device that detects a used period of at least one of the input device and the output device and selects one of the plurality of color matching profiles based on the detected used period, if necessary, for performing an update process which updates the color matching profile used by the color matching processing device,
the updating device deleting the color matching profile corresponding to an expired used period, from the profile memory unit.

2. The color matching system according to claim 1,
the updating device performing the update process after a power supply is applied to the input device and the output device.

3. The color matching system according to claim 1,
the updating device performing the update process at predetermined times.

4. An electronic apparatus, comprising:
a color matching system as recited in claim 1;
an input device; and
an output device, which are associated with each other.

* * * * *